United States Patent
Cook

(10) Patent No.: US 8,225,736 B2
(45) Date of Patent: Jul. 24, 2012

(54) HUB GLOW POINTER

(75) Inventor: David Cook, South Lyon, MI (US)

(73) Assignee: DENSO International America, Inc., Southfield, MI (US)

( * ) Notice: Subject to any disclaimer, the term of this patent is extended or adjusted under 35 U.S.C. 154(b) by 807 days.

(21) Appl. No.: 12/360,575

(22) Filed: Jan. 27, 2009

(65) Prior Publication Data

US 2010/0186661 A1 Jul. 29, 2010

(51) Int. Cl.
  *G01D 11/28* (2006.01)
(52) U.S. Cl. .................. 116/288; 116/286; 116/DIG. 6; 116/DIG. 36; 362/29
(58) Field of Classification Search .......... 116/286–288, 116/305, 334, DIG. 36, 328, 332, DIG. 6; 362/26–30, 85
  See application file for complete search history.

(56) References Cited

U.S. PATENT DOCUMENTS

| | | | | |
|---|---|---|---|---|
| 2,831,453 A * | 4/1958 | Hardesty | ....................... | 116/288 |
| 4,300,470 A * | 11/1981 | Furukawa | ..................... | 116/332 |
| 4,625,262 A * | 11/1986 | Sakakibara et al. | ............. | 362/26 |
| 4,860,170 A * | 8/1989 | Sakakibara et al. | ............. | 362/26 |
| 4,878,453 A * | 11/1989 | Inoue et al. | ................... | 116/288 |
| 5,546,888 A * | 8/1996 | Skiver et al. | ................. | 116/286 |
| 6,032,608 A * | 3/2000 | Oreans et al. | ................. | 116/288 |
| 6,178,917 B1 * | 1/2001 | Jansa | ............................. | 116/286 |
| 6,846,101 B2 * | 1/2005 | Coushaine | .................... | 362/517 |
| 6,955,438 B2 * | 10/2005 | Ishii | ............................... | 362/29 |
| 7,066,630 B1 * | 6/2006 | Venkatram | .................... | 362/489 |
| 7,163,303 B1 * | 1/2007 | Venkatram | ..................... | 362/26 |
| 7,270,434 B2 * | 9/2007 | Obata et al. | ..................... | 362/23 |
| 7,404,374 B2 * | 7/2008 | Kato | ............................. | 116/286 |
| 7,475,999 B2 * | 1/2009 | Mezouari | ........................ | 362/26 |
| 7,575,331 B2 * | 8/2009 | Birman et al. | ................. | 362/27 |
| 7,607,808 B2 * | 10/2009 | Birman et al. | ................ | 362/489 |
| 7,637,623 B2 * | 12/2009 | Wang et al. | ..................... | 362/30 |
| 7,665,413 B2 * | 2/2010 | Birman et al. | ................ | 116/288 |
| 2008/0264328 A1 * | 10/2008 | Birman et al. | ................ | 116/288 |

FOREIGN PATENT DOCUMENTS

JP 2006-064526 3/2006
* cited by examiner

Primary Examiner — Peter Macchiarolo
Assistant Examiner — Tania Courson
(74) Attorney, Agent, or Firm — Harness, Dickey & Pierce, PLC

(57) ABSTRACT

A gauge of an instrument cluster includes a glow hub. The gauge includes a dial and a pointer including a hub portion rotatably mounted in the instrument cluster and movable to a plurality of positions. A light source is disposed in the gauge and adapted to direct light in a first direction through a translucent portion of the hub. A first reflecting surface portion of the hub is adapted to receive light directed from the light source and adapted direct light in a second direction. A second reflecting surface portion of the hub is adapted to receive light directed from the first reflecting surface portion and adapted to direct light in a third direction.

12 Claims, 3 Drawing Sheets

HUB GLOW POINTER

FIELD

The present invention relates to a vehicle instrument cluster gauge incorporating a pointer with a glow hub.

BACKGROUND

This section provides background information, which is not necessarily prior art, related to the present disclosure. Instrument clusters on automobiles generally include numerous gauges for displaying operation information such as vehicle speed, engine RPM, engine coolant temperature, fuel tank level and many other types of information. The gauges may include analog or digital displays for displaying the information depending on the gauge manufacturer and styling preferences. An analog gauge typically includes a faceplate having indicia, such as numerals, and graduations demarking such indicia, and a pointer for rotating to the appropriate indicia and numeral combination.

One important design consideration for an instrument cluster and related gauges is the ability of a vehicle operator to quickly and easily view and read the gauges in all driving environments. Typically an instrument cluster gauge is illuminated by a light source such as a light bulb or light emitting diode (LED), for example.

SUMMARY

This section provides a general summary of some aspects of the present disclosure and is not a comprehensive listing or detailing of either the full scope of the disclosure or all of the features described therein. In one form, the present teachings provide an instrument cluster gauge with a glow hub. The gauge includes a pointer and a hub portion rotatably mounted in the instrument cluster and movable to a plurality of positions. A light source may be disposed and adapted to direct light in a first direction. A first reflecting surface of the hub is adapted to direct light in a second direction while a second reflecting surface of the hub is adapted to direct light in a third direction.

In another form, the present teachings provide an instrument cluster gauge with a glow hub. The gauge includes a dial, a pointer including a hub portion rotatably mounted in the instrument cluster and movable to a plurality of positions, a light source disposed in the gauge and adapted to direct light in a first direction through a translucent portion of the hub. A first reflecting surface portion of the hub is adapted to receive light directed from the light source and adapted direct light in a second direction. A second reflecting surface portion of the hub is adapted to receive light directed from the first reflecting surface portion and adapted to direct light in a third direction.

In another form, the present teachings provide an instrument cluster gauge with a glow hub. The gauge includes a dial, a pointer including a hub portion rotatably mounted in the instrument cluster and movable to a plurality of positions, and a light source disposed in the gauge and adapted to direct light in a first direction through a translucent portion of the hub. The teachings may also provide a conical protrusion of the hub having a first reflecting surface adapted to receive light directed from the light source and adapted to direct light in a second direction parallel to a plane of the dial and a concave portion of the hub having a second reflecting surface adapted to receive light directed from the first reflecting surface and adapted to direct light in a third direction perpendicular to the plane of the dial. The first reflecting surface is disposed centrally within the concave portion, and the second reflecting surface may define a light intensity gradient. The light intensity gradient may have a high intensity proximate a center of the second reflecting surface, and decrease in intensity moving radially outward from the center of the second reflecting surface.

Further areas of applicability will become apparent from the description provided herein. It should be understood that the description and specific examples in this summary are intended for purposes of illustration only and are not intended to limit the scope of the present disclosure, its application and/or uses in any way.

BRIEF DESCRIPTION OF THE DRAWINGS

The drawings described herein are for illustrative purposes only and are not intended to limit the scope of the present disclosure in any way. The drawings are illustrative of selected teachings of the present disclosure and do not illustrate all possible implementations. Similar or identical elements are given consistent identifying numerals throughout the various figures.

DETAILED DESCRIPTION OF THE VARIOUS EMBODIMENTS

Figure 1:
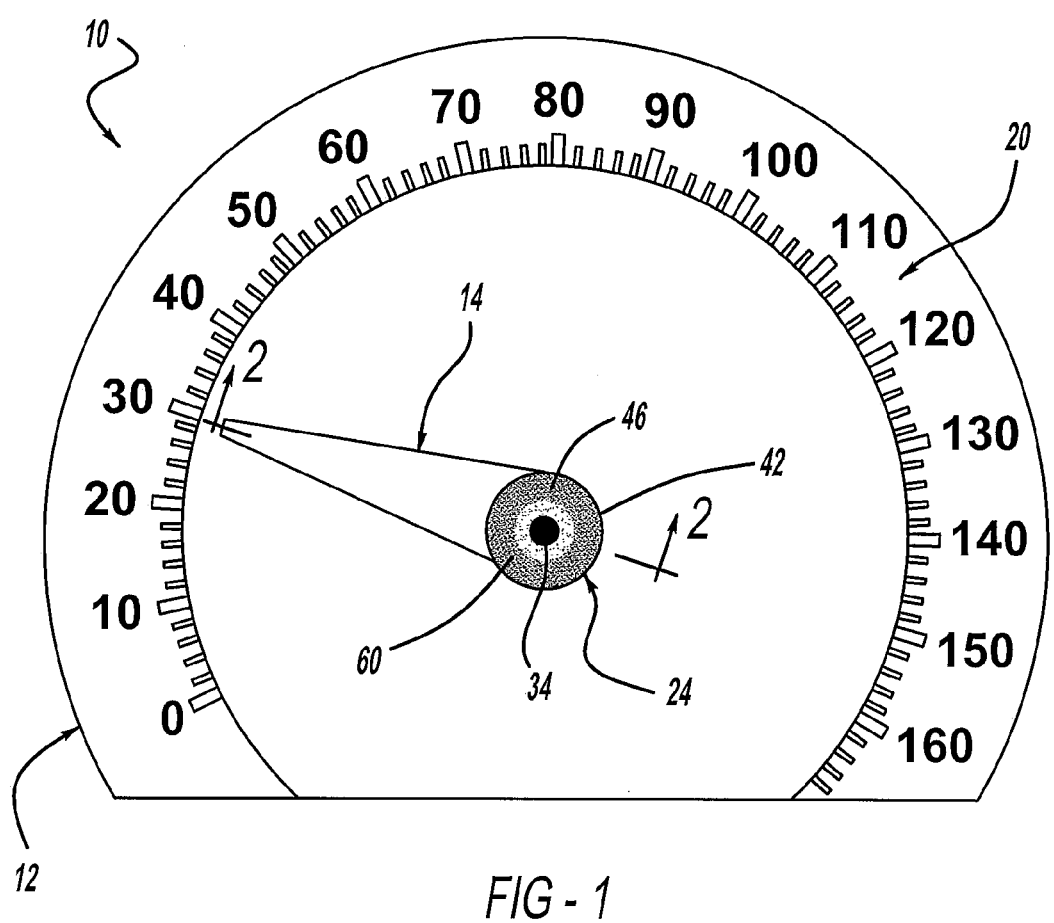
FIG. 1 is a front view of a vehicle speedometer according to the present teachings.

The following description of the preferred embodiments is merely exemplary in nature and is in no way intended to limit the invention, its application, or uses. FIG. 1 depicts an automotive vehicle with an exemplary instrument cluster 10, which may include various gauges and dials which are to be viewed and/or operated by an occupant, such as a driver, of the vehicle. As an example, a speedometer 12 may be used to display the vehicle speed relative to the road upon which the vehicle is traveling. While the following discussion is specifically directed toward a speedometer, the same discussion may be applied to other vehicle gauges such as, but not limited to, a tachometer for example. Continuing, the speedometer 12 may include a movable pointer 14 which correlates to the speed of the vehicle. To provide meaningful graphical information to the occupant, a dial or faceplate 20 of the speedometer 12 forms the background for the pointer 14 of the speedometer 12.

With reference to FIGS. 1-4, the speedometer 12 may provide a lighting configuration in which a light source, such as light source 52, provides illumination onto a concave portion of concave body portion 22 of a hub 24 in the form of a light intensity gradient G. The light intensity may be the brightest or have the highest intensity proximate to or at the center of the concave portion of concave body portion 22 and may be less bright or less intense in a radial direction farthest from or radially outward from the center of the concave portion of concave body portion 22, as viewed from a typical viewer's perspective, such as a driver's perspective. Thus, a light intensity gradient G is present and is viewable by a viewer. The light intensity gradient G is such that the brightest portion is at the center of the concave portion of concave body portion 22 and less bright as one looks away from the center of the concave portion of concave body portion 22.

Figure 2:
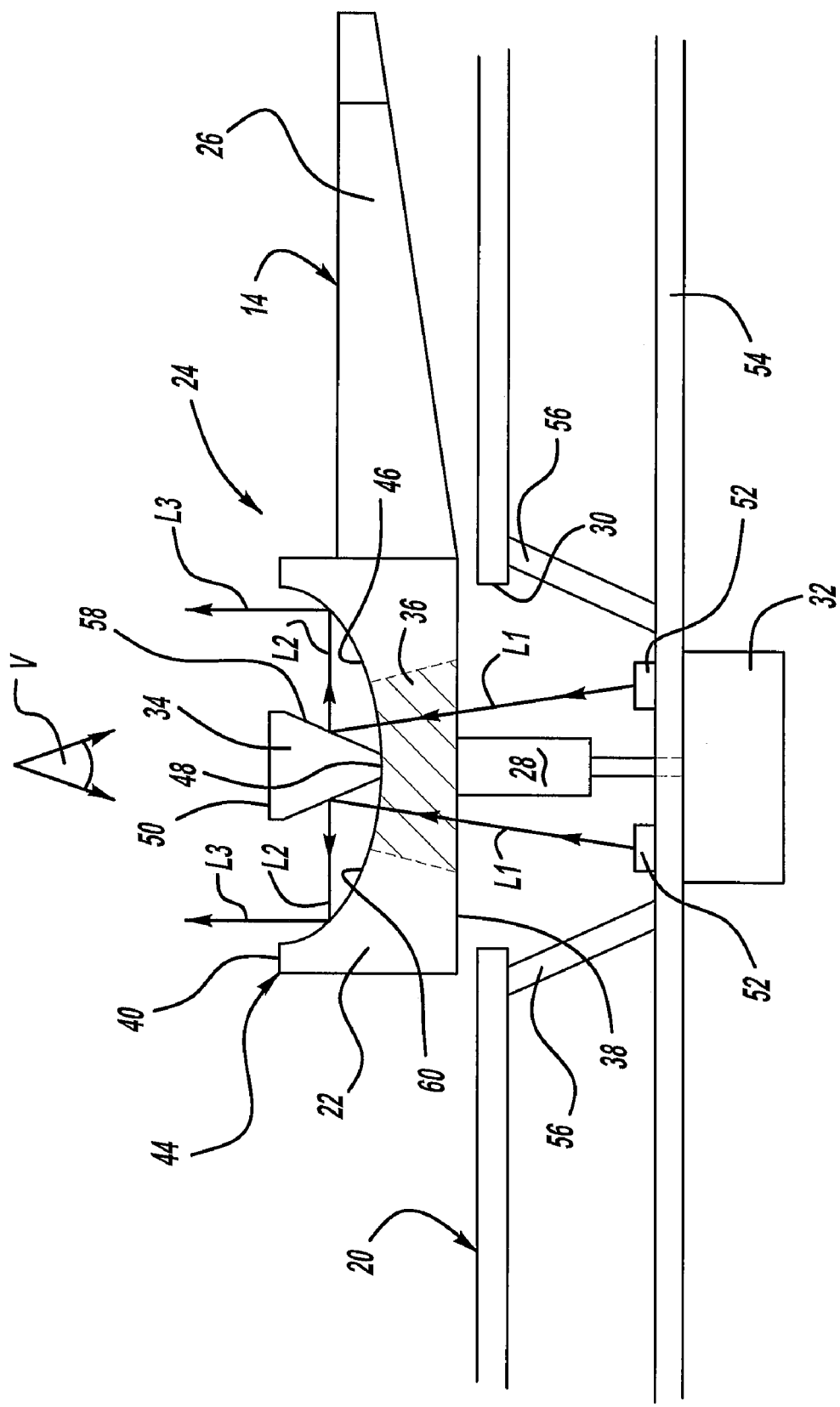
FIG. 2 is a cross-sectional view of FIG. 1 taken along line 2-2.
Figure 3:
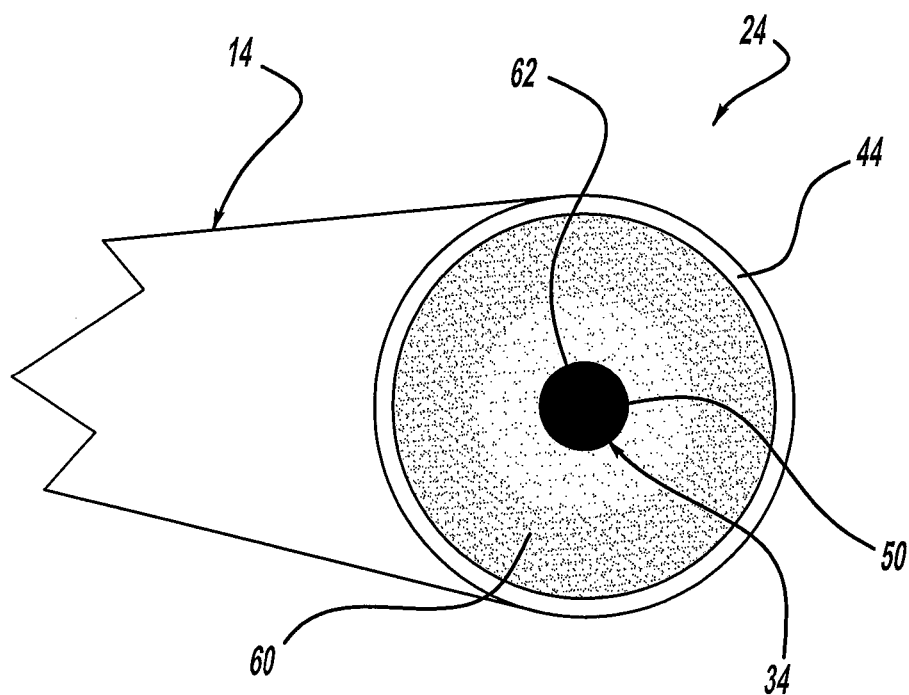
FIG. 3 is a front view of one aspect of a hub and pointer according to the present teachings.

With further reference to FIG. 2, the pointer 14 of the speedometer 12 may define a generally longitudinal portion 26 extending from the hub 24. The hub 24 may define a shaft 28 that extends through a passage 30 in the faceplate 20. The shaft 28 may be coupled for rotatable movement with a motor 32, which may communicate with a vehicle module (not shown) and transmit rotational motion onto the pointer 14 indicative of vehicle speed. The hub 24 may include the concave body portion 22, a conical protrusion 34 and a translucent portion 36. The hub 24 may have a first surface 38, also known as a bottom surface 38, and a second surface 40, also known as a top surface. The top surface 40 may have a concave portion and the bottom surface 38 may be flat and may be parallel to the top surface of the faceplate 20. The top surface 40 and the bottom surface 38 may also be parallel. The second surface 40 may have a perimeter or boundary that defines a flat land 44, as depicted in FIG. 2 and FIG. 3, or a boundary or perimeter that defines a point 42 (FIG. 1), thus making the second surface a completely curved or concave inward surface with no land or flat surface. The concave body portion 22 may be concentrically disposed about shaft 28 and may include the translucent portion 36 also concentrically disposed about shaft 28. The translucent portion 36 may extend from the first surface 38 of the hub 24 to a concave surface 46 of the concave body portion 22. The concave body portion 22 defines a concave cavity. The concave body portion may have one side that is flat and parallel to the faceplate while the opposite side defines the concave cavity (FIG. 2). The conical protrusion 34, which may partially or entirely lie within the confines of the concave body portion 22, may have a small diameter end 48, relative to an opposite larger diameter end 50. The small diameter end 48 may be coupled to the concave surface 46, such as by welding or an adhesive, for example. The small diameter end 48 may alternatively couple to shaft 28. The large diameter end 50 of the conical protrusion 34 may extend to a plane of the second surface 40 of the hub 24 or protrude above the second surface 40, such as closer to a viewer and farther from the faceplate 20. The conical protrusion may be disposed centrally within the concave portion and the concave reflecting surface may define a light intensity gradient, the light intensity gradient having a high intensity proximate a center of the geometric center of the reflective concave surface, and decreasing in intensity radially outward from the geometric center of the reflective concave surface.

A series of light sources 52 may extend from a printed circuit board 54 for directing light within a chimney 56 and through the translucent portion 36 of the hub 24. The series of light sources 52 may comprise any suitable light emitting source for use in an instrument cluster such as, but not limited to, a light bulb or light emitting diode (LED). The chimney 56 may be angled with respect to the faceplate 20 and connect the faceplate 20 to the printed circuit board 54.

Figure 4:
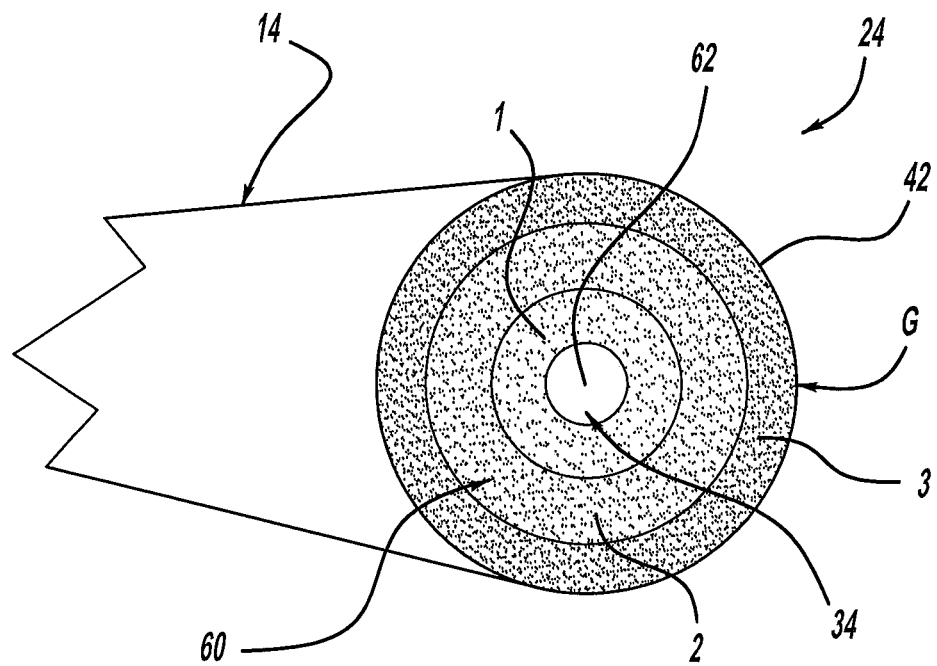
FIG. 4 is a front view of a second aspect of a hub and pointer according to the present teachings.

With further reference to FIG. 4, and continuing reference to FIG. 2, the light intensity gradient G may be formed on the concave surface 46 of concave portion of concave body portion 22 by reflecting light entering through translucent portion 36. The light sources 52 may direct light in a first direction L1 through translucent portion 36 and contact a first reflective surface 58 of conical protrusion 34. The direction L1 is a direction that is from the light source 52 and may be toward and into the translucent portion 36. The translucent portion 36, as depicted in FIG. 2, may be in the form of a trapezoid or approximately trapezoidal in shape. More specifically, the translucent portion 36 may have a bottom surface parallel to the faceplate 20, but the top surface of the translucent portion 36 may be concave inward into the concave body portion 22 so that the top surface of the translucent portion, which is part of the concave surface 46, is not flat or parallel to the bottom surface 38. The non-translucent portion of the concave body portion 22 may not permit light to pass through it or glow when light reaches the bottom surface 38, yet the second reflective surface 60 or concave surface 60 remains reflective.

With continued reference to FIG. 2, after the light L1 passes through the translucent portion 36, the light L1 strikes and reflects from the first reflective surface 58. The first reflective surface 58 may direct the light in a second direction L2 generally parallel to a plane of the dial 20; however, the reflected angle is dependent upon the angle at which the light L1 strikes the first reflective surface 58. The light from the first reflective surface 58 may next contact the concave surface 46 of concave portion of concave body portion 22. The concave surface 46 may be a second reflective surface 60 and may direct the light in a third direction L3 generally perpendicular to the plane of the dial 20 towards the view V or eyes of the vehicle occupant.

The light directed onto the second reflective surface 60 may create the light intensity gradient G thereon. The first and second reflective surfaces 58 and 60 are positioned in such a way that the reflected light intensity may be the greatest proximate a center 62 of second reflective surface 60, as indicated by ring 1 or area 1, and may decrease in intensity moving radially outward from the center 62. As depicted in FIG. 4, a ring 2 or area 2 may have a light intensity less than area 1, but a light intensity greater than a ring 3 or area 3 located on a distal portion of the concave surface 46. As depicted in FIG. 2, the angle of first reflective surface 58 relative to the surface 38 determines part of the intensity of light L2 that strikes within area 1 or ring 1 (FIG. 4). The less the angle of surface 58 with surface 38, the greater the light intensity at area 1, as viewed by a viewer of the rotating or ratable hub 24. Therefore, to increase the intensity of the light in area 1, as viewed by a driver, for instance, the end 50 may be made larger in diameter, while the end 48 remains fixed or is made smaller. To further increase the intensity in area 1, the diameter of the translucent portion at the concave surface 46 may be made the same diameter of the end 50 or smaller than the diameter of the end 50, both of which will concentrate reflected light L2 in area 1, or around the conical protrusion 34, and to a lesser degree, proximate top surface 40, such as in area 2 and area 3. Thus, with the larger light entrance area of the translucent portion 36 at the surface 38, relative to its exit portion at the concave surface 46, light is able to be concentrated as it passes through the translucent portion 36. In cross-section, the hub 24 diameter is larger than the hole in the faceplate 20, through which the shaft 28 passes, which prevents light from escaping around the diameter of the hub 24.

While the reflecting surface 60 has been described as concave, such is not necessarily required in functional, structural embodiments. The surface 60, may be flat, angled in some fashion, parallel or nearly parallel to surface 58 in order to achieve the functional effects described above.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims.

Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A vehicle instrument cluster gauge comprising:
a printed circuit board;
a light source mounted to the printed circuit board;
a gauge faceplate positioned parallel to the printed circuit board; and
a pointer with a hub portion rotatably positioned on a side of the faceplate opposite that of the printed circuit board, the hub portion rotatable to a plurality of positions, the hub portion defining a concave body portion and a concave cavity with a reflective concave surface on a side of the hub portion opposite the faceplate; wherein
the hub portion further comprises a translucent portion and a non-translucent portion; and
the translucent portion has a surface on a flat portion of the hub portion and a surface on the concave surface of the hub portion.

2. The vehicle instrument cluster of claim 1, wherein the translucent portion tapers and concentrates light at the concave surface, relative to the flat surface.

3. The vehicle instrument cluster of claim 2, further comprising:
a conical protrusion that protrudes from the translucent surface and resides at least partially within the concave cavity, wherein the conical protrusion has a reflective surface that reflects light onto the concave surface.

4. The vehicle instrument cluster of claim 3, wherein the conical protrusion resides completely within the concave cavity.

5. The vehicle instrument cluster of claim 4, wherein a diameter of the hub portion is greater than a passage of the faceplate over which the hub portion is rotatable.

6. A vehicle instrument cluster gauge comprising:
a printed circuit board;
a light source mounted to the printed circuit board;
a gauge faceplate positioned parallel to the printed circuit board a pointer with a hub portion rotatably positioned on a side of the faceplate opposite that of the printed circuit board, the hub portion rotatable to a plurality of positions, the hub portion defining a concave body portion and a concave cavity with a reflective concave surface on a side of the hub portion opposite the faceplate; and
a conical protrusion that protrudes from the hub portion and resides at least partially within the concave cavity, wherein the conical protrusion has a conical reflective surface that reflects light onto the concave surface, wherein the conical protrusion includes a small diameter end and a large diameter end, the small diameter end coupled to the concave surface of the concave body portion.

7. The gauge of claim 6, wherein:
the light source directs light in a first direction through the concave body portion,
the light strikes the conical reflective surface and directs the light in a second direction to the reflective concave surface; and
the reflective concave surface directs the light in a third direction to a viewer.

8. The gauge of claim 7, wherein the concave reflective surface defines a light intensity gradient, the light intensity gradient having a high intensity proximate a center of the second reflecting surface, and decreasing in intensity moving radially outward from the center of the second reflecting surface.

9. The gauge of claim 8, wherein the concave body portion further comprises a translucent portion through which the light source directs the light in the first direction.

10. A gauge of a vehicle instrument cluster comprising:
a faceplate defining a hole and a readable surface;
a motor;
a printed circuit board; and
a pointer attached to a rotable hub portion, the hub portion mounted to the motor and over the readable surface of the faceplate, the hub portion further comprising:
a concave body portion with one surface parallel to the faceplate and facing the faceplate, and a reflective concave surface on a side opposite the faceplate;
a translucent portion in the hub;
a light source disposed on the printed circuit board and adapted to direct light in a first direction through the translucent portion in the hub; and
a conical protrusion protruding from the concave body portion with a conical reflective surface to receive light from the light source, wherein the reflective concave surface is positioned to receive light from the conical protrusion and direct light toward a viewer.

11. The gauge of claim 10, wherein the conical protrusion includes a small diameter end and a large diameter end, the small diameter end attached to the reflective concave surface of the concave body portion.

12. The gauge of claim 11, wherein:
the conical protrusion is disposed centrally within the concave portion, and
the concave reflecting surface defines a light intensity gradient, the light intensity gradient having a high intensity proximate a center of the geometric center of the reflective concave surface, and decreasing in intensity radially outward from the geometric center of the reflective concave surface.

* * * * *